US011085449B2

(12) United States Patent
Modica et al.

(10) Patent No.: US 11,085,449 B2
(45) Date of Patent: Aug. 10, 2021

(54) PUMP ASSEMBLY FOR RECIRCULATING A COOLING FLUID OF A HEAT ENGINE

(71) Applicants: FPT INDUSTRIAL S.p.A., Turin (IT); BARUFFALDI S.p.A., Tribiano (IT)

(72) Inventors: Massimiliano Modica, Settimo Torinese (IT); Mariano Turco, Mondovi' (IT)

(73) Assignees: FPT INDUSTRIAL S.p.A., Turin (IT); BARUFFALDI S.p.A., Tribiano (IT)

( * ) Notice: Subject to any disclaimer, the term of this patent is extended or adjusted under 35 U.S.C. 154(b) by 189 days.

(21) Appl. No.: 15/305,159

(22) PCT Filed: Apr. 30, 2015

(86) PCT No.: PCT/IB2015/053170
§ 371 (c)(1),
(2) Date: Oct. 19, 2016

(87) PCT Pub. No.: WO2015/166458
PCT Pub. Date: Nov. 5, 2015

(65) Prior Publication Data
US 2017/0037853 A1    Feb. 9, 2017

(30) Foreign Application Priority Data
Apr. 30, 2014   (IT) .......................... MI2014A000803

(51) Int. Cl.
*F04D 13/02*    (2006.01)
*F01P 5/12*     (2006.01)
(Continued)

(52) U.S. Cl.
CPC .............. *F04D 13/021* (2013.01); *F01P 5/10* (2013.01); *F01P 5/12* (2013.01); *F04D 1/00* (2013.01);
(Continued)

(58) Field of Classification Search
CPC . F04D 13/02; F04D 13/06; F04D 1/00; F04D 13/027; F04D 15/00;
(Continued)

(56) References Cited

U.S. PATENT DOCUMENTS 2,840,315 A * 6/1958 Heiss .................... F01P 7/04
                                                    236/35
3,400,797 A * 9/1968 Horn ...................... F16D 27/09
                                                    188/161

(Continued)

FOREIGN PATENT DOCUMENTS

CN    86101262       9/1987
DE    102009033616   1/2011

(Continued)

OTHER PUBLICATIONS

International Search Report and Written Opinion for International Application No. PCT/IB2015/053170, dated Sep. 10, 2015, 11 pages.

(Continued)

*Primary Examiner* — Philip E Stimpert
(74) *Attorney, Agent, or Firm* — Stetina Brunda Garred & Brucker

(57) ABSTRACT

Pump assembly for recirculating a cooling fluid of a heat engine, comprising:
  a pump body, an impeller driven by a driven shaft and inserted in a chamber of the circuit for recirculating the cooling fluid of the heat engine;
  at least a reversible friction clutch, adapted to transmit the motion from motion generating means, coupled to the motor shaft of the vehicle, to the driven shaft,
  an electric motor to drive said driven shaft independently of the heat engine; wherein
  said electric motor and said friction clutch are arranged in an axially external position with respect to the motion generating means of the clutch.

(Continued)

Preferably, said electric motor is axially opposed to the friction clutch with respect to the motion generating means, and is axially adjacent to the chamber of the impeller in the axial direction.

20 Claims, 8 Drawing Sheets

(51) Int. Cl.
| | |
|---|---|
| *F16D 27/112* | (2006.01) |
| *F01P 5/10* | (2006.01) |
| *F04D 15/00* | (2006.01) |
| *F04D 13/06* | (2006.01) |
| *F04D 29/22* | (2006.01) |
| *F16D 13/46* | (2006.01) |
| *F16D 27/14* | (2006.01) |
| *F04D 1/00* | (2006.01) |

(52) U.S. Cl.
CPC ........... *F04D 13/027* (2013.01); *F04D 13/06* (2013.01); *F04D 15/0027* (2013.01); *F04D 29/22* (2013.01); *F16D 13/46* (2013.01); *F16D 27/112* (2013.01); *F16D 27/14* (2013.01); *F01P 2005/125* (2013.01)

(58) Field of Classification Search
CPC ...... F04D 15/0027; F04D 29/22; F04D 13/46; F04D 13/021; F04D 29/5806; F01P 5/10; F01P 5/12; F01P 2005/125; F16D 27/112; F16D 27/14; F04B 39/064
USPC ...................................................... 417/423.8
See application file for complete search history.

(56) References Cited

U.S. PATENT DOCUMENTS

| | | | | | |
|---|---|---|---|---|---|
| 3,637,329 | A | * | 1/1972 | Sato | ..................... F04D 13/0613 |
| | | | | | 417/360 |
| 4,290,393 | A | * | 9/1981 | Hart | ........................ F01P 7/087 |
| | | | | | 123/41.11 |
| 2003/0200759 | A1 | * | 10/2003 | Iwanami | .............. B60H 1/3222 |
| | | | | | 62/133 |
| 2005/0031455 | A1 | * | 2/2005 | Boffelli | ................. F04D 13/026 |
| | | | | | 417/213 |
| 2006/0249348 | A1 | | 11/2006 | Poy | |
| 2011/0123365 | A1 | * | 5/2011 | Buchholz | .................. F01P 5/12 |
| | | | | | 417/319 |
| 2014/0174873 | A1 | * | 6/2014 | Qin | .......................... F16D 13/76 |
| | | | | | 192/66.32 |
| 2016/0017945 | A1 | * | 1/2016 | Louis | ..................... F16D 65/52 |
| | | | | | 188/196 B |

FOREIGN PATENT DOCUMENTS

| | | | |
|---|---|---|---|
| JP | S61266057 | 11/1986 | |
| JP | 2009050066 | 3/2009 | |
| JP | 2009293399 | 12/2009 | |
| JP | 2013083259 | 5/2013 | |
| WO | WO2012142016 | 10/2012 | |
| WO | WO 2012142016 A2 * | 10/2012 | .............. F16D 27/11 |

OTHER PUBLICATIONS

Office Action of corresponding Brazilian Patent Application No. BR112016025520-8, dated May 13, 2020, 4 pages.

* cited by examiner

PUMP ASSEMBLY FOR RECIRCULATING A COOLING FLUID OF A HEAT ENGINE

CROSS-REFERENCE TO RELATED APPLICATIONS

The present application claims priority to PCT International Application No. PCT/IB2015/053170 filed on Apr. 30, 2015, which application claims priority to Italian Patent Application No. MI2014A000803 filed Apr. 30, 2014, the entirety of the disclosures of which are expressly incorporated herein by reference.

STATEMENT RE: FEDERALLY SPONSORED RESEARCH/DEVELOPMENT

Not Applicable

FIELD OF THE INVENTION

The object of the present invention is a pump for recirculating the cooling fluid of heat engines, particularly of vehicles, with a friction clutch control device, with electromagnetic, pneumatic and hydraulic drive and electric motor integrated in the pump body.

DESCRIPTION OF PRIOR ART

In the engine manufacturing industry, in particular heat engines, there is the need to cool the engine by recirculating a cooling fluid, driven by a corresponding recirculation pump, whose impeller is rotated by a shaft driven by a pulley and by a belt coupled to the motor shaft.

It is also known that the recirculation of the cooling fluid must be effected at a flow rate corresponding to the actual cooling requirement determined by the real conditions of use of the engine and by the external temperature, to avoid keeping constantly and unnecessarily full speed rotating devices which absorb useful power, thus increasing the wear of the various components and the vehicle consumption.

It is also known that, as a solution to this problem, devices have been proposed for controlling the shaft of the pump impeller whose rotation depends on the engagement of a friction clutch for transmitting a rotational motion dependent on the revolutions of the motor shaft, and on an electric motor which, as an alternative, operates when the clutch is disengaged, for a controlled rpm rotation independent from the motor shaft.

Therefore, it is known that the control of the pump operation by means of the electric motor allows greater versatility in response to the different cooling requirements, while its operation through the clutch, driven by the shaft of the heat engine, depends on the number of rotations, rpm, of the engine, and cannot therefore provide an appropriate cooling, for example, in case of an engine shutdown or of low rpm of the engine.

Examples of such devices are known, e.g., from WO 2012/142065.

Although functional, such devices have nevertheless severe drawbacks which limit their application, in particular because they have a substantially cylindrical and stubby shape which is difficult to house.

Moreover, this implies that the drive pulley coupled to the motor shaft, defined by the body of the pump assembly, has a considerable diameter.

For example, in WO2012142016, the drive pulley is arranged circumferentially with respect to the electric motor, i.e. in correspondence of the electric motor and, therefore, its diameter depends on the size of the electric motor.

In order to limit the radial development of the body of the pump assembly, the prior art has tried to limit the size of the electric motor coupled to the pump shaft. But this has led to a significant reduction of the pump performance, unable to provide a sufficient flow rate of cooling fluid for the correct cooling of the heat engine.

The pump assembly should have a small size, particularly radially, but at the same time should be able to provide high torques, also at a correspondingly reduced rotation speed of the engine in order to be also applicable to high flow pumps of heavy vehicles with an engine at low rpm, or with a rotation of the impeller at low rpm with the heat engine at high rpm, while ensuring an adequate cooling of the parts of the device subject to overheating.

The device should also be easy and inexpensive to produce and assemble, and should be easily installed, with no need for special adaptations of the belt.

SUMMARY OF THE INVENTION

Therefore, the object of the present invention is to solve the above problems, providing a pump assembly for recirculating cooling fluids for vehicle engines.

This object is achieved by means of a pump assembly for recirculating cooling fluids of heat engines for vehicles and the like according to the features of claim 1.

The present invention provides a pump body having a longitudinal development defining two opposite ends, whose second end is intended to be coupled to a body of a heat engine and whose first end is intended to protrude from the body of the heat engine.

A middle part of the axial development of the pump body has a considerably reduced radial section, thus being particularly suitable for defining a pulley to be coupled to a drive belt.

According to the present invention, the pump body shows an axial symmetry from said second end to at least said pulley, including it.

Therefore, the pump body has two axial opposite expansions following the axial development of the body, separated by said pulley.

More in particular, the pump body is formed by a fixed portion, that is, the radial expansion intended to be fixed to the body of the heat engine, and by a portion rotatably coupled to the first one. The rotatable portion defines said pulley in correspondence of the aforesaid reduced radial section.

In other words, the pump body can be defined as a double bell, one bell being rotatably engaged on the other in correspondence of the smaller bases.

The axial expansions house a hydraulic pump, an electric motor for driving the hydraulic pump and a friction clutch for connecting/disconnecting the hydraulic pump and the pulley.

It is clear that the friction clutch can be of any kind, namely electromagnetic, pneumatic, hydraulic, etc.

Analogously, it is clear that the electric motor integrated in the pump body to operate the impeller can have an internal or external rotor with respect to the stator, can be synchronous or asynchronous, brushless or manifold, fed with direct or alternating current.

The claims describe preferred embodiments of the invention, thus forming an integral part of the present description.

BRIEF DESCRIPTION OF THE DRAWINGS

Further details may be obtained from the following description of non-limiting examples of embodiments of the present invention, provided with reference to the accompanying drawings which show as follows.

FIG. 7: a diagrammatic and partial cross section according to the plane III-III of FIG. 3a.

The same numbers and the same reference letters in the figures identify the same elements or components.

In the present description, the term "second" component does not imply the presence of a "first" component. These terms are in fact used only for clarity and are not intended as limiting.

DETAILED DESCRIPTION OF THE PREFERRED EMBODIMENTS

Figure 1:
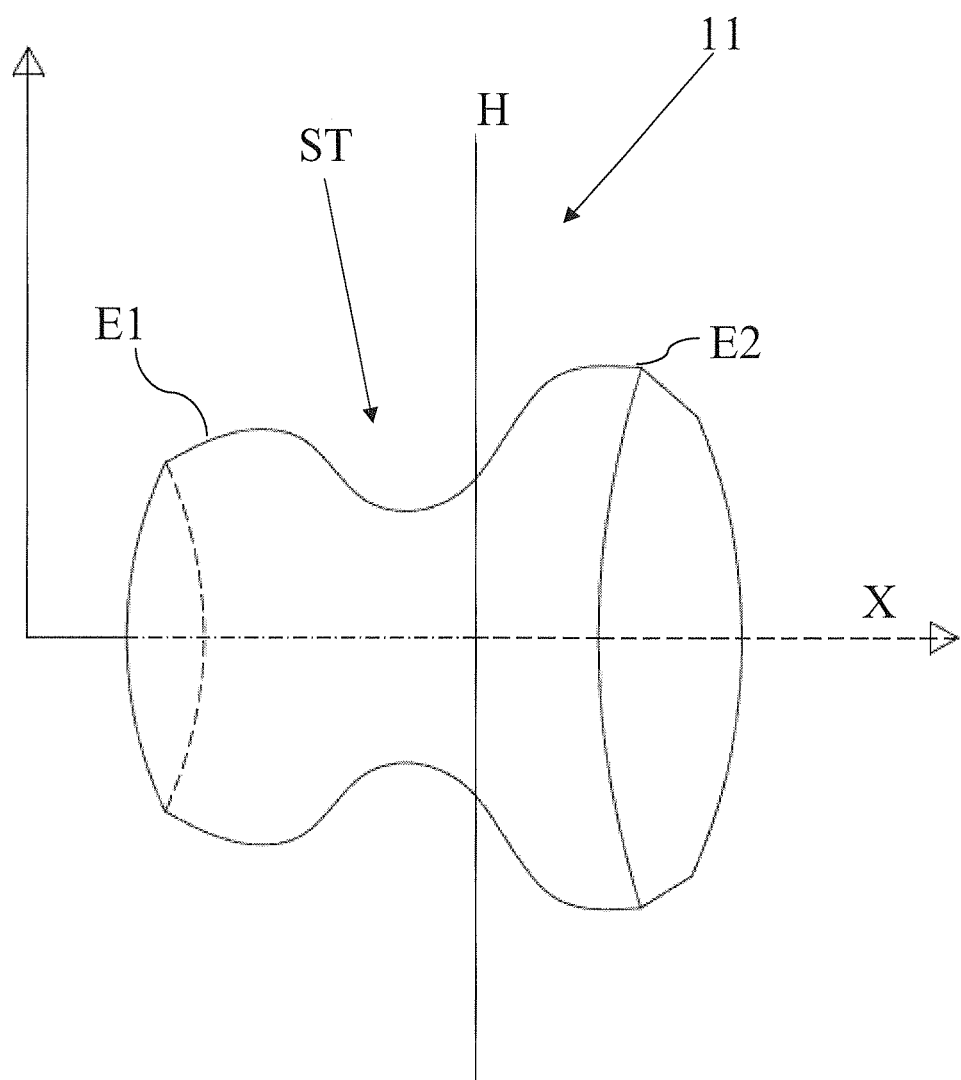
FIG. 1: a conceptual side view of the pump body object of the present invention.

FIG. 1 shows in a conceptual way the pump body 11 according to the present invention.

Said pump body 11 has a longitudinal development X defining two opposite ends E1 and E2. The second end E2 is intended to be associated to the body of a heat engine, while the first end E1 is intended to protrude from the body of the heat engine.

The portion going from the second end E2 to the axis H has axial symmetry. This is also recognizable by the fact that the axis X, in this portion, is of the dash-dot type.

In the remaining portion, namely, from the axis H to the second end E2, the pump body may have any shape: this is recognizable by the fact that starting from the axis H, the axis X is indicated by a broken line.

A middle part of the pump body 11 has an axial narrowing portion ST defining a pulley 21a.

Figure 2:
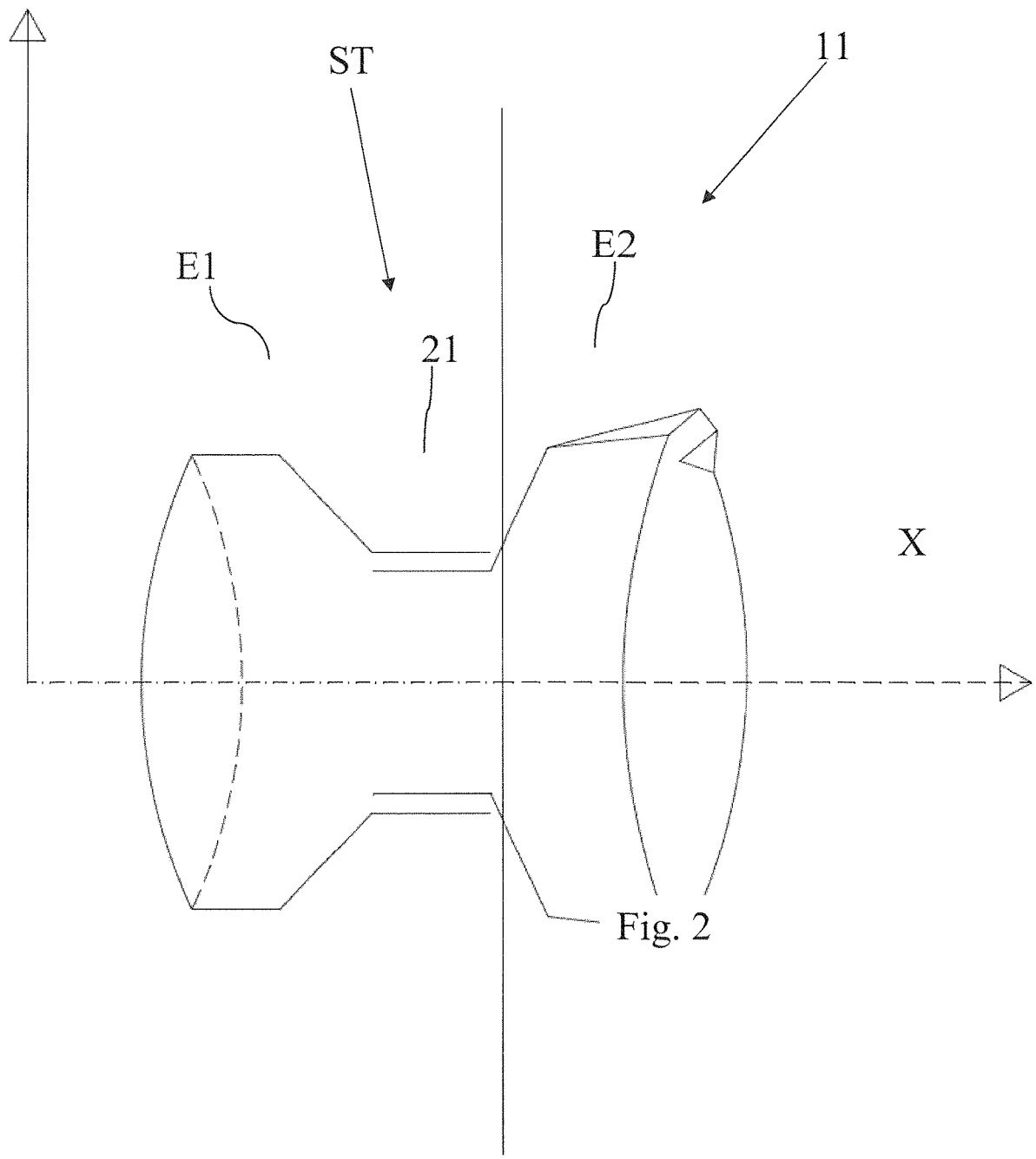
FIG. 2: a schematic side view of the pump body according to FIG. 1.

FIG. 2 shows a preferred embodiment of the present invention, clearly distinguishing the two portions forming the pump body 11 of FIG. 1.

The opposite ends E1 and E2 define, with regard to the middle portion ST, two axial expansions (indicated with the same references E1, E2), suitable for housing a hydraulic pump, an electric motor for driving the hydraulic pump and a friction clutch for connecting/disconnecting the hydraulic pump and the pulley.

The following figures show that the impeller 1 of the pump and an electric motor 30, operatively coupled to the shaft 2 of the impeller 1, are housed in the second expansion E2.

The shaft 2 of the impeller 1 is also operatively coupled to the pulley 21a by means of an electromagnetic clutch 20, housed in the first expansion E1.

Advantageously, the shape of the pump body 11 is such to allow its easy housing and an easy connection with the belt.

Furthermore, the second expansion E2 can have such a radial size to allow the housing and the cooling of an electric motor suitable for the purposes of the present invention, ensuring an adequate level of performance without any limitation.

With reference to FIG. 2, the first expansion E1 is rotatably coupled to the second expansion E2, in correspondence of the narrowing section ST. This rotatable coupling is achieved, as clearly visible in FIG. 3, by means of a bearing 40.

Figure 3:
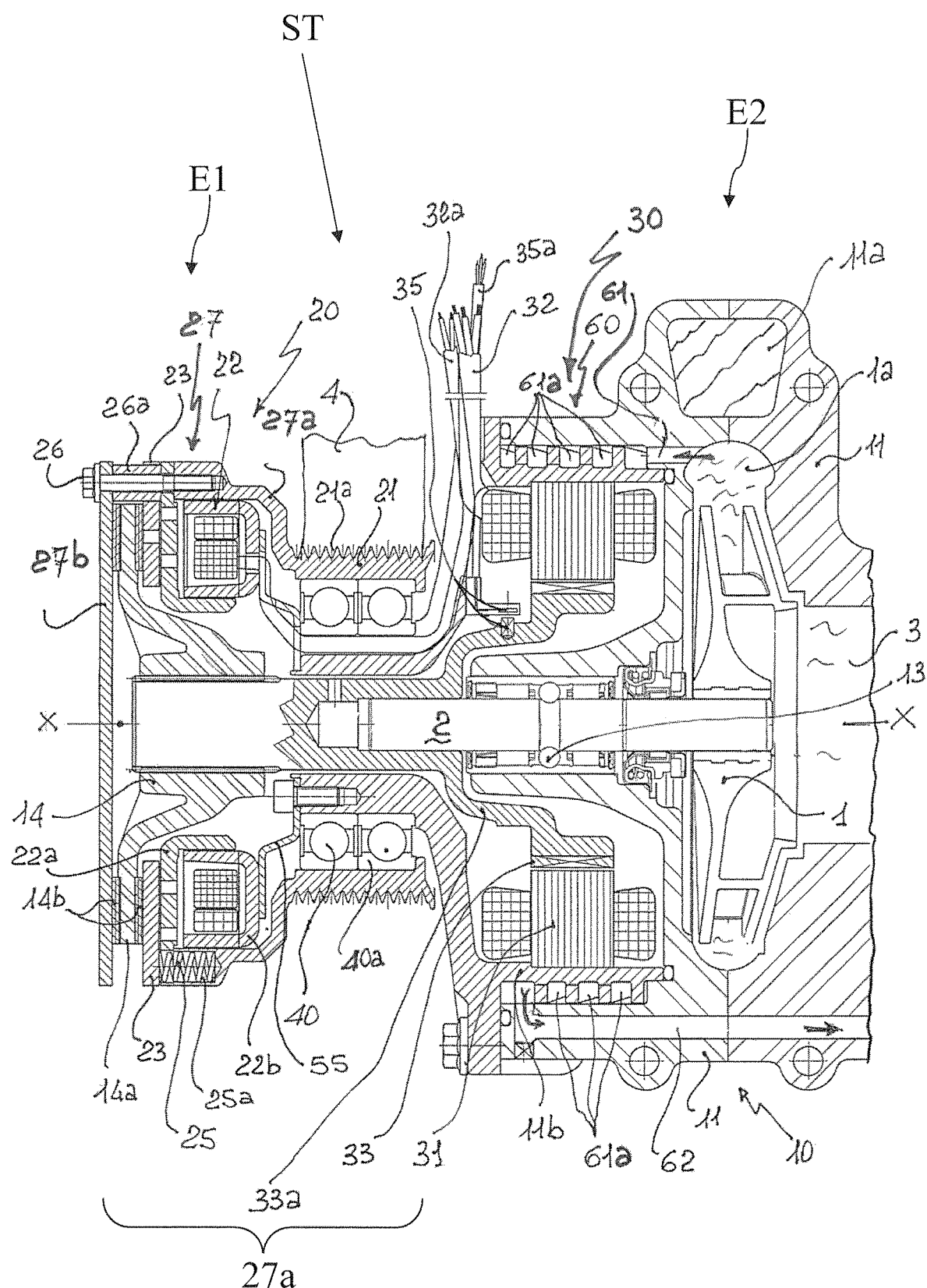
FIG. 3: a schematic side view of a longitudinal section of an embodiment of the device according to the present invention, with engaged clutch.
Figure 4:
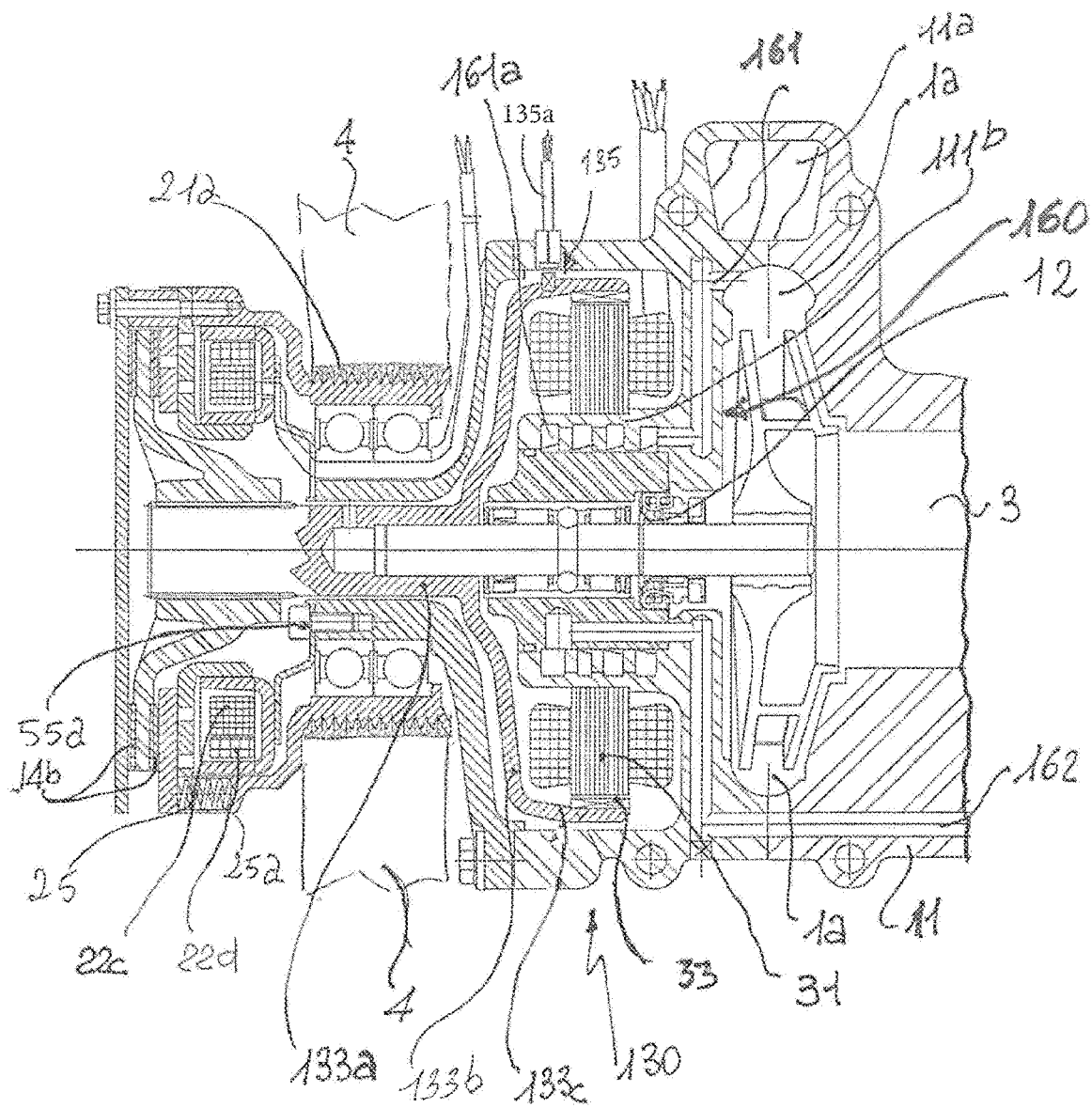
FIG. 4: a schematic side sectional view of a longitudinal section of a second embodiment of the device according to the present invention, with engaged clutch.

As illustrated in FIGS. 3 and 4, in the shown example, the impeller 1 of a pump for recirculating the cooling fluid for heat engines of vehicles and the like is mounted at one end of a shaft 2 supported by a fixed assembly 10 comprising the pump body 11 suitable for being fixed, in turn, to the base 11a of the heat engine.

A sealing gasket 12, coaxial to the shaft 2, and a bearing 13 on whose inner ring the impeller shaft 2 is keyed, are arranged inside the pump body 11.

A second bearing 40 is mounted outside the pump body 11. The outer ring 40a of the bearing is integral with a suitably shaped bell 21, on whose outer circumferential edge a pulley 21a is formed, said pulley being suitably engaged with a belt 4 for transmitting the motion of the heat engine shaft to the pump shaft 2 by means of a friction clutch 20 described below.

Since the tension of the belt 4 is discharged on the outer bearing 40, the size of the inner bearing 13, which is not subjected to large dynamic loads, can be limited, to the advantage of its duration and of the containment of the overall dimensions.

The bell 21 has an extension in the axial direction (27a) forming the rotor 27 of the friction clutch 20.

The clutch 20 is an electromagnetic clutch which comprises a fixed electromagnet 22, whose body 22b is fixed to a structure 55, in turn fixed to the pump body 11 by screws 55a, and a keeper 23 arranged in front of the electromagnet 22, on an axially opposite side to this latter with respect to an element 22a for concatenating the magnetic flow generated by the excitement of the electromagnet 22. The element 22a is integral with the rotor 27 with which it turns, though remaining axially fixed.

The screws 26 with the respective bushes 26a constitute the fastening element to the rotor 27 of an annular plate 27b, axially fixed and integrally rotating with the rotor 27, arranged on the opposite side to the electromagnet 22 with respect to the keeper 23.

An annular flange 14a, integrally rotating with the shaft 2 of the impeller 1 and axially slidable with respect to the shaft 2, is interposed between the plate 27b and the keeper 23. In particular, it is integral with a sleeve 14, internally grooved to be coupled to a corresponding axial portion of a rotor bell 33a integral with the shaft 2, so that the annular flange 14a integrally rotates with this latter, though remaining axially movable.

Some friction material 14b is applied on the opposite faces of the annular flange 14a.

The keeper 23 is subjected to an axial thrust, away from the electromagnet 22 and towards the fixed plate 27b, exerted by one or more springs 25 axially contained in corresponding seats 25a of the axial extension 27a/rotor 27, against which they react.

Figure 3A:
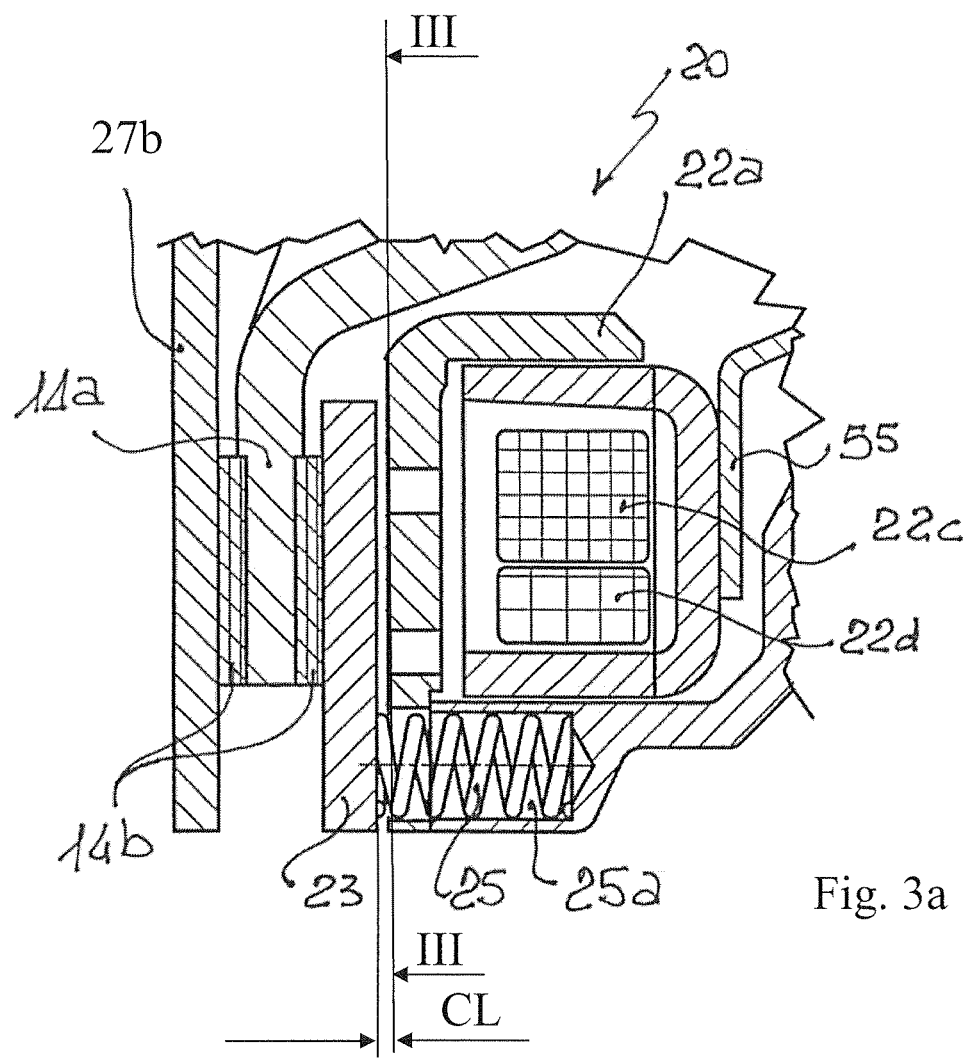
FIG. 3a: a magnified portion of the view of FIG. 3, with engaged clutch.
Figure 7:
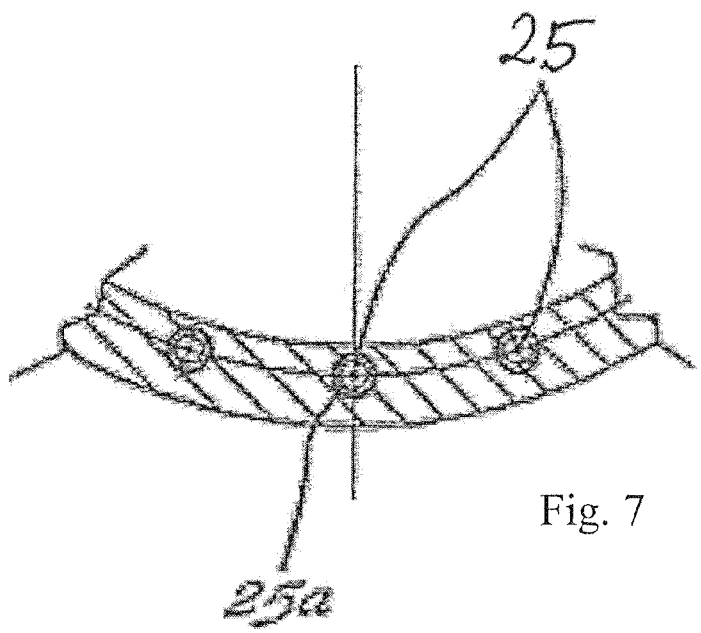

FIG. 7 shows a partially removed portion along the line III-III of FIG. 3a, showing the springs 25 in their respective seats 25a.

Such circumstances determine an engagement of the clutch in which the keeper 23 adheres to the flange 14a and is detached from the element 22a for concatenating the flow, see FIG. 3a.

Therefore, a space CL is defined between the keeper 23 and the element for concatenating the flow.

Figure 3B:
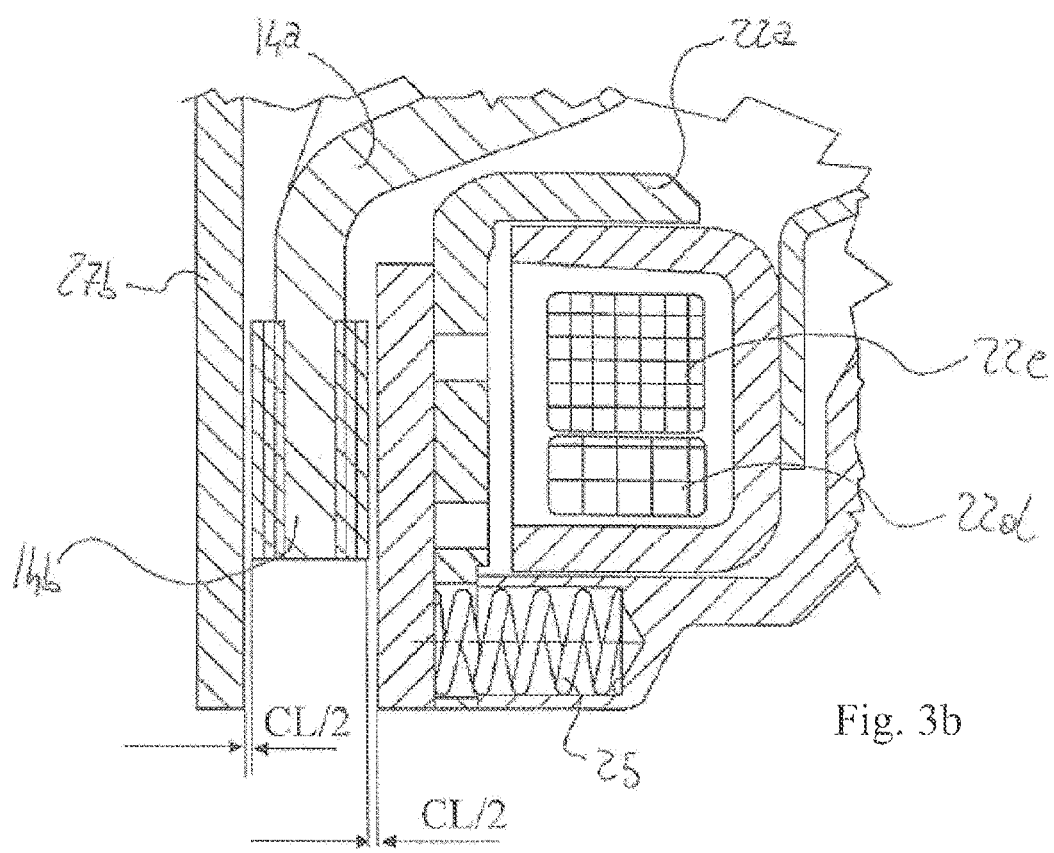
FIG. 3b: the same portion of FIG. 3a, with disengaged clutch.

When, on the other hand, the electromagnet is activated, the keeper is drawn towards the element 22a for concatenating the flow, see FIG. 3b, and the aforesaid space is substantially equally distributed between the flange 14a and the keeper 23 (CL/2) and between the flange 14a and the plate 27b (CL/2).

Thanks to this coupling, the opening/closing of the magnetic flow determines axial translations of the keeper 23 to/from the fixed plate 27b so as to clamp the annular flange 14a between the keeper 23 and the plate 27b and then transmit the motion from the rotor 27 to the shaft 2.

Therefore, this configuration is "normally engaged", namely it guarantees the so called "fail-safe" function: even in case of a failure of the control system or of any other failure, the pump is at least driven by the belt coupled to the motor shaft.

According to another embodiment of the present invention, not shown in the figures, the keeper 23 is axially fixed and rotationally integral with the rotor 27, while the plate 27a is rotationally integral with the rotor 27, and axially movable. The springs 25 act on the plate 27a and not on the keeper 23.

This configuration is the opposite of the one previously described. When the electromagnet is switched off, the springs move away the plate 27a which releases the flange 14a.

On the other hand, when the electromagnet is active, the flange 14 is drawn toward the keeper 23, and the plate 27a is attracted towards the flange 14a, thereby obtaining the packing up of the rotor. This configuration, unlike the previous one, is "normally disengaged".

With reference to the embodiment of FIG. 3, an electric motor 30 coupled to the pump shaft 2 is housed in the radial expansion E2, namely in a position axially external to the pulley 21a.

As clarified below, this coupling can be carried out in many different ways.

In FIG. 3, the stator 31 of the electric motor 30 is supported by the structure of the pump body 11. The rotor 33 of the electric motor 30 is rotationally integral with the pump shaft 2 through the rotor bell 33a.

The electric power supply of the motor is obtained by a cable 32 coupled to an electric power source of the engine and to control means (not shown).

Preferably, the cable 32 also includes excitation wires of the electromagnet 22 which are led to this latter through a suitable branch 32a of the cable which, passing inside the inner ring of the bearing 40, crosses the structure 55 supporting the electromagnet 22; this allows to easily power both the electric motor 30 and the electromagnet 22 of the friction clutch 20.

Preferably, the electric motor 30 is arranged in a position axially opposite to the friction clutch 20, namely in the radial expansion E2, with respect to the narrowing portion ST wherein the pulley 21a is arranged. This allows to limit the overall radial size of the assembly, and in particular of the pulley 21a.

As shown in FIG. 1, the electric motor 30 is preferably axially adjacent to the chamber 1a of the pump impeller 1 coupled to the circuit 3 for recirculating the cooling fluid of the heat engine.

A delivery channel 61 for leading the cooling fluid to a cooling circuit 60 of the electric motor 30 originates from said chamber 1a. The cooling circuit 60 of the electric motor extends through the pump body 11 to terminate in a return channel 62, in turn coupled to the cooling circuit 3 of the fluid. This allows to exploit the cooling fluid of the heat engine also for cooling the electric motor 30 for actuating the impeller 1.

Preferably, the cooling circuit 60 of the electric motor is formed in the part 11b of the pump body 11 which supports the stator 31 of the electric motor 30, thus ensuring a proper cooling of the stator of the electric motor, which is most subject to overheating.

FIG. 3 shows a radial flow motor 30, the stator 31 being fixed to the part 11b of the pump body 11 in a radially external position to the rotor 33, namely in the radial expansion E2.

It is advantageous to shape said cooling circuit 60 of the electric motor 30 as a continuous spiral channel 61a, circumferentially formed on the part 11b of the pump body 11 which supports the stator 31 of the electric motor. This allows a proper and uniform distribution of the cooling fluid over the entire axial extension of the stator 31, and an easy return of the fluid to the cooling circuit 3 of the fluid through the channel 62.

As shown in FIG. 3, this allows to provide the outer circumferential surface of the part 11b of the pump body supporting the stator 31 with the channels 61a of the cooling circuit 60 of the electric motor, as well as to have a smooth delivery and return of the cooling fluid, with delivery channels 61 and return channels 62, respectively preferably axially extended from the chamber 1a of the impeller and to the cooling circuit 3.

The pump assembly according to one preferred embodiment of the present invention also includes a sensor 35 for detecting the number of revolutions of the rotor 33 of the electric motor 30, and therefore of the pump impeller. This sensor 35 is preferably mounted on/or close to the bell rotor 33a, from which it detects the number of revolutions of the shaft.

Advantageously, as exemplified in FIG. 3, the sensor 35 is coupled to the control means through suitable cables 35a branching from the supply/control cable 32 of the electric motor.

With this configuration, the pump assembly operates as follows:

−) if the electromagnet 22 is not excited, see FIG. 3a, the keeper 23 is constantly pushed by springs 25, axially away from the concatenating element 22a and towards the annular plate 27b fixed to the rotor 27; therefore, the translation locks the flange 14a of the sleeve 14 between the keeper 23 and the plate 27b; in this condition the flange 14a transmits the motion of the rotor 27 to the driven shaft 2 and to the impeller 1, which rotate with the same speed of the pulley 21a of the motion generating means, and therefore according to the number of revolutions of the heat engine;

−) if the electromagnet 22 is excited, the induced magnetic field overcomes the thrusting action of the springs 25, axially bringing the keeper 23 back towards the concatenating element 22a, with the consequent release of the flange 14a from the keeper 23 and then from the rotor 27, thus determining a neutral condition of the shaft 2, see axial spaces CL/2;

+) if, together with the neutral condition of the shaft 2, a rotation of the impeller 1 with a predetermined number of revolutions is still required, the electric motor 30 is powered through the control unit (not shown) so that the motion of the rotor 33 rotates the shaft 2 at the speed suitable for recirculating the fluid actually required by the operating conditions;

+) in the event of a power failure, the electric motor 30 is deactivated and the electromagnet 22 is de-energized, thus causing the engagement of the friction clutch 20, under the thrust of the springs 25, and, consequently, the rotation of the impeller 1 with a number of revolutions determined by the rpm of the motion generating means 21, 21a and of the rotor 27.

Thanks to the position of the electric motor 30, axially outside the narrowing portion ST and opposite to the friction clutch 20 with respect to the narrowing portion ST, the electric motor 30 may further have such a size to generate a sufficient torque to ensure the activation of the pump impeller 1 only by means of the electric motor 30 in most conditions, while ensuring modulability and versatility in the management of the recirculation pump and therefore energy saving and performance optimization.

With reference to the second preferred embodiment, shown in FIG. 4, the electric motor 130 is a radial flow motor, whose stator 31 is fixed to the part 111b of the pump body 11 radially inside the rotor 33. The rotor bell 133a, 133b, 133C has a substantially radial arm 133b suitably extended beyond the radial extension of the stator 31, and a substantially axial extension 133c, supporting the rotor 33, which extends from the radially outer end of said radial arm 133b to the impeller 1.

In other words, the bell 133a, 133b, 133c that helps to define the rotor 33 surrounds the stator 31 of the electric motor 30.

The cooling of the stator 31 of the motor 130 takes place also in this case by means of a cooling circuit 160 extended on the radially inner portion 111b of the pump body 11 supporting the stator 31. Advantageously, the delivery channel 161 and the return channel 162 may, in this case, be extended inside the pump body 11, thus allowing to connect the circuit 3 for recirculating the fluid with said cooling circuit 160 of the electric motor 130.

Also in this case it is advantageous that said channel 161a of the circuit 160 spirally extends around the radially inner portion 111b of the pump body, suitable for supporting the stator 31.

The sensor 135 for detecting the number of revolutions of the rotor 33 of the electric motor 130 is in this case preferably mounted on, or close to, the axial extension 133c of the rotor bell 133a which is integral with the rotor 33, in correspondence of which it detects the rpm number of the rotor 1, allowing an easy and direct detection.

Thanks to this configuration it is easy to connect the sensor 135 to the appropriate control means, since it is easily accessible also through the cables 135a directly led to the pump body 11 (FIG. 2).

The operation of the embodiment of FIG. 4 is similar to what described in relation to FIG. 3.

Figure 5:
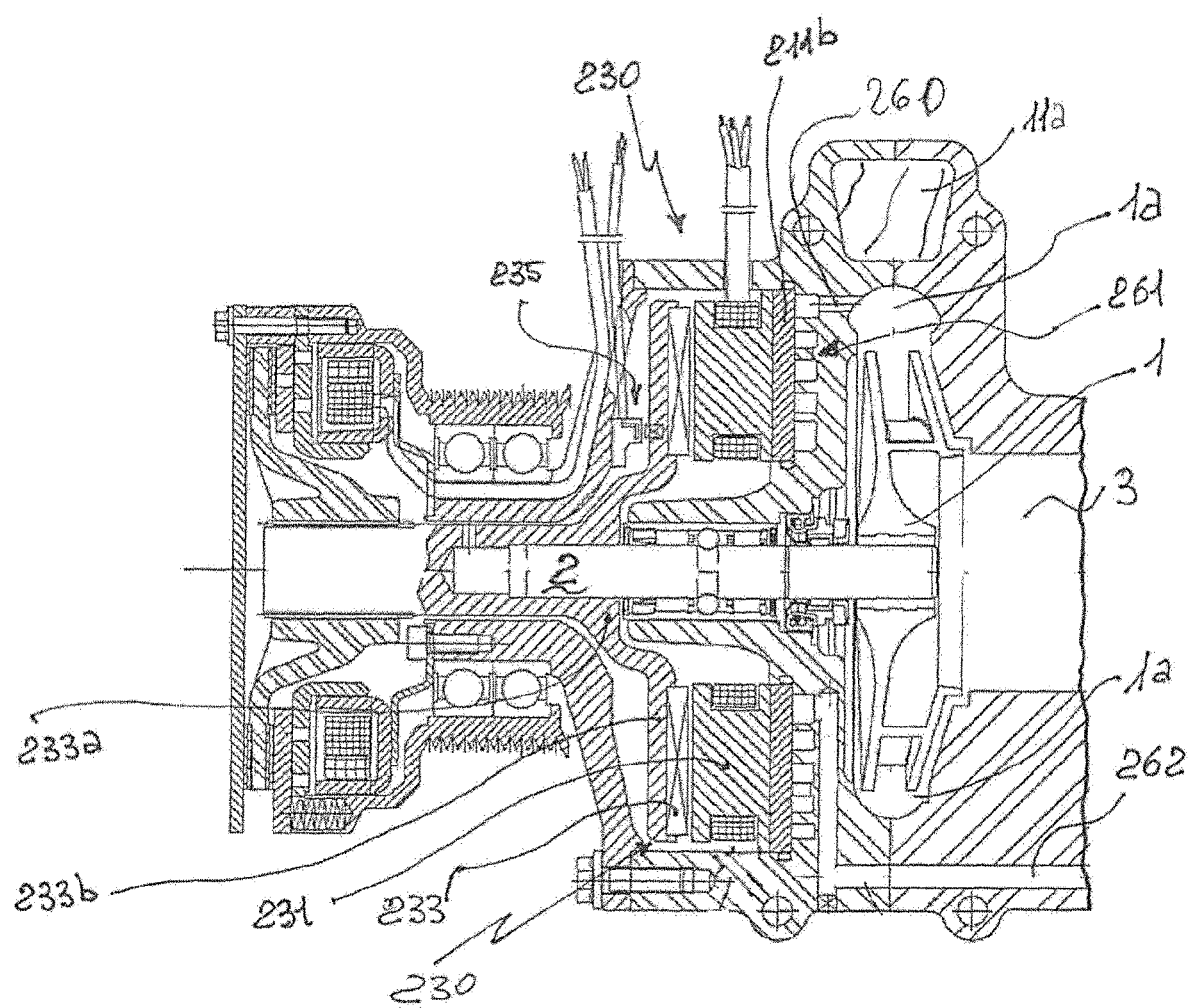
FIG. 5: a schematic side sectional view of a longitudinal section of a third embodiment of the device according to the present invention, with engaged clutch.

With reference to FIG. 5, it is now described a further exemplary embodiment of the pump assembly according to the invention with the axial flow electric motor 230.

The electric motor 230 of the pump assembly of FIG. 3 comprises a stator 231 arranged in a position axially close to the chamber 1a of the impeller 1, supported by a shorting disc 233b of the electromagnetic induction generated by the coils 231 of the stator adjacent to the chamber 1a. The rotor 233 of the motor 230 is axially arranged in front of the stator 231 and is supported on a radial extension 233b of the bell rotor 233a, in turn integral with the shaft 2 of the impeller. Therefore, the delivery of the cooling fluid from the chamber 1a of the impeller 1 to the cooling circuit 260 of the electric motor 230 through the delivery channel 261, and the return of the fluid to the chamber 1a through the return channel 262 is facilitated.

According to preferred embodiments of the invention, shown for example in FIGS. 3a and 3b, the electromagnet 22 controlling the disengagement (or engagement, in the case of the opposite configuration, described above but not shown in the figures) of the electromagnetic clutch 20 includes at least two coils 22c and 22d which can be powered to obtain:

a high initial return force of the keeper 23 to overcome the thrusting force of the springs 25 on the keeper, and a successive reduced force holding the keeper 23 against the flow plate 22a.

According to a first embodiment of the electromagnet 22, one of the two coils 22c, 22d is more powerful than the other; in this case, an initial excitation of the more powerful coil for the disengagement of the clutch 20 is followed, once the keeper 23 has returned, by an excitation of only the less powerful coil for holding the keeper 23, thereby minimizing the power absorbed by the disengagement and by the maintenance of the clutch disengagement condition.

According to a further embodiment, the two coils 22c, 22d may be of equal power and may be connected via a power supply circuit which can be switched from parallel to series and vice versa. In this case, for the disengagement of the clutch 20, the connection circuit of the two coils 22c, 22d is in parallel, thus causing the initial excitation in parallel of both coils and a consequent high initial attraction force of the keeper to the electromagnet 22; once the keeper 23 has returned, the power supply circuit switches to a power supply in series of the two coils 22c, 22d, thus holding the keeper in the axial return position but with a very reduced power absorption by the electromagnet 22.

Therefore, in all configurations, the coils are excited by a high initial power amount to overcome the high resistance of the keeper, kept at a distance from the electromagnet by the spring 25, and by a subsequent reduced amount of power sufficient to hold the keeper, then already axially close to the electromagnet, thus obtaining besides the disengagement of the clutch also the technical effect of reducing the power absorption and the overheating of the various parts.

According to a further preferred embodiment, the excitation of the electromagnet 22 is controlled through the PWM technique (Pulse Width Modulation) modulating the voltage/power supply, in order to supply a large amount of voltage/power for a short period (over-pulse) to overcome the thrusting force of the springs 25 on the keeper, and pulses of short duration and a reduced amount of power once the keeper is attached to the electromagnet and requires a reduced maintenance power; the PWM is per se conventional and therefore not described in detail.

Furthermore, the electric motor is preferably a brushless motor.

Figure 6:
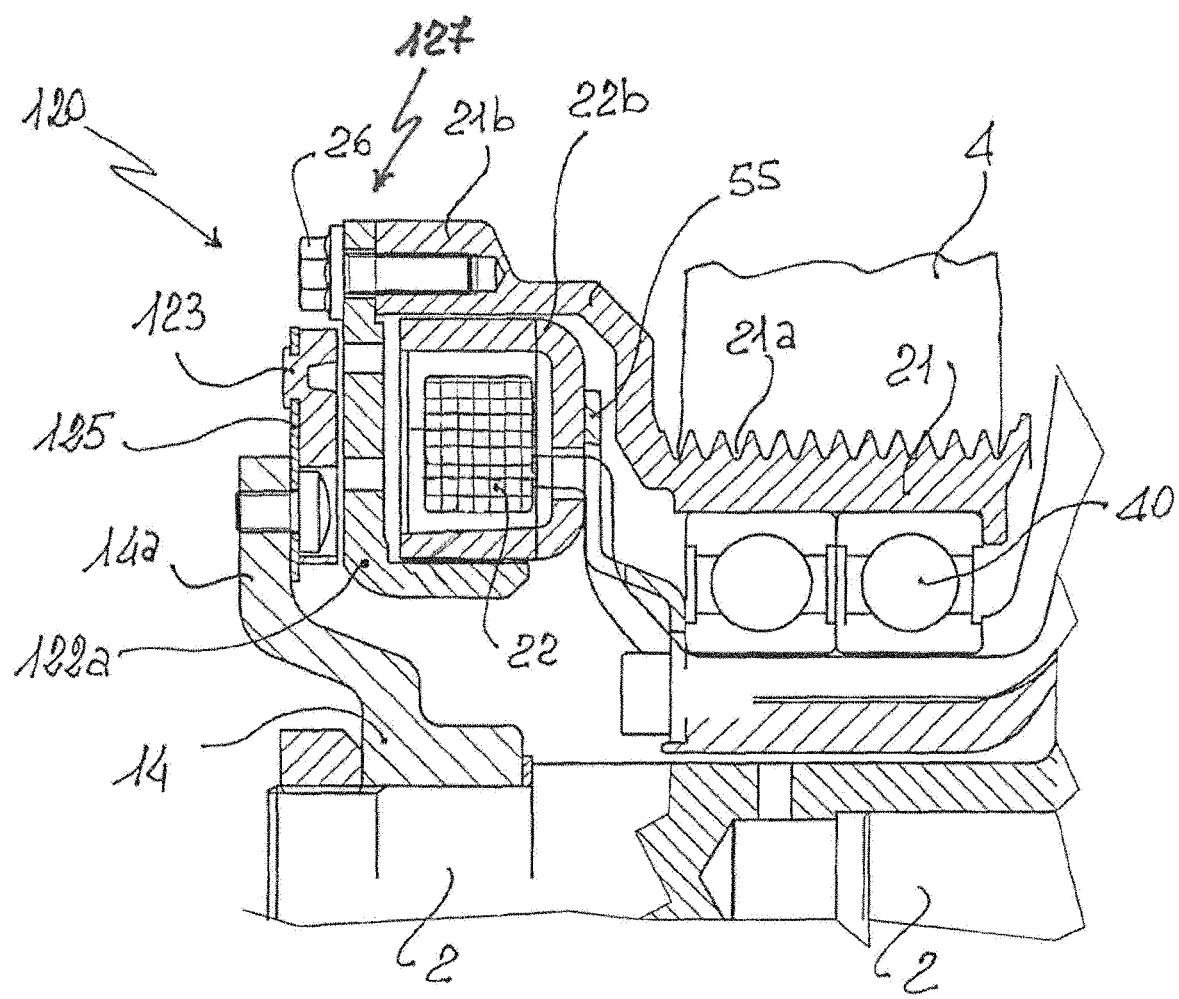
FIG. 6: a view in detail of a further embodiment of the clutch of the pump assembly with engaged friction clutch according to the invention.

A further embodiment of the pump assembly according to the invention (FIG. 6), provides an excitation clutch 120; in this embodiment the keeper 123 is integral with the annular flange 14a through an elastic membrane 125 which binds the rotating keeper, but allows its axial movement by elastic deformation; the element 122a for concatenating the magnetic flow is constrained to the rotor 127 through the screws 26.

In this configuration, the clutch is "normally disengaged" and its engagement with motion transmission to the shaft 2 occurs by exciting the electromagnet 22 which, overcoming the elastic reaction of the membrane 125, draws the keeper

123 back against the concatenating element 122a integral with the rotor 127, thus causing the rotation of the shaft of the pump 2.

It is therefore clear how the pump according to the invention allows to obtain an effective recirculation of the cooling fluid of vehicles, which can be varied according to the actual need through the reciprocating drive by means of the heat engine through the friction clutch or by means of an auxiliary electric motor, maintaining, however, a limited radial size thanks to the particular arrangement of the electric motor, axially external to the pulley connecting it to the heat engine.

Such limited radial size allows to obtain a pulley 21a having a reduced diameter, with a consequent multiplication of the revolutions transmitted by the belt 3, which makes the device, and therefore the pump, also suitable for vehicles with engines running at low rpm, but requiring a high rotation speed of the cooling pump.

Moreover, if the friction clutch 20 is disengaged, the pump can be driven by the electric motor 30 at a rpm number independent of the rpm of the heat engine, in particular:

at low rpm, with a heat engine at high rpm; and at the appropriate rpm even with a heat engine off or at low speed, in order to ensure the recirculation and hence the cooling of the heat engine even in case of temporary stops such as, for example, in cases of stop-and-go at traffic lights, or after switching off the heat engine.

Moreover, the tightening of the flange 14a in the shoe formed by the keeper 23 and by the annular plate 27b of the rotor 27 causes a further important effect, namely the absence of axial loads on both the support bearings of the impeller shaft and on the support bearings of the pulley, to the advantage of the bearing life.

Thanks to the cooling circuit of the electric motor and to its arrangement axially close to the pump impeller, the cooling fluid of the heat engine can be also used for cooling the electric motor, thus improving its performance.

The described cooling circuit is not necessarily dependent on the implementation of the double pole expansion as herein described, and it can be individually implemented, for example, in WO2012142016.

Analogously, the double arrangement of magnetic coils for the operation of the clutch can be implemented in any hybrid electric pump similar to the present invention or to WO2012142016.

Similarly, the characteristics of the reversible clutch can be implemented in any similar reversible clutch.

Alternative embodiments of the described non-limiting example are possible without departing from the scope of protection of the present invention, including all equivalent embodiments for a person skilled in the art.

From the above description, the person skilled in the art is able to manufacture the object of the invention without introducing any further construction details. The elements and features shown in the various preferred embodiments can be combined without leaving the scope of protection of the present application. What described in the description of the state of the art, unless specifically excluded in the detailed description, must be considered in combination with the features of the present invention, therefore forming an integral part of the present invention.

The invention claimed is:

1. Pump assembly for recirculating a cooling fluid of a heat engine, comprising:
    a pump body defining a pulley sized and configured to be rotationally driven by the heat engine, the pump body housing:
        an impeller driven by a driven shaft, the impeller being coupled to a cooling circuit for recirculating the cooling fluid of the heat engine;
        at least one clutch sized and configured to connect/disconnect said pulley to/from said driven shaft; and
        an electric motor coupled to said driven shaft to rotationally drive the impeller when said clutch is disconnected;
    characterized in that
        said pump body defines a longitudinal development having a radial narrowing portion axially disposed between said electric motor and said clutch, the pulley being axially coextensive with and disposed about the radial narrowing portion and entirely between the electric motor and the clutch,
        wherein the longitudinal development of the pump body has, on each side of the narrowing portion, a larger portion having a larger radial extent than the narrowing portion, said larger portions housing said electric motor and said clutch, respectively, and the pulley has a smaller maximum radial extent than both said larger portions, said electric motor having a larger radial extent than the maximum radial extent of the pulley.

2. Pump assembly according to claim 1, characterized in that one of said larger portions, which is intended to be coupled to said heat engine, defines a chamber of the impeller, and wherein said electric motor is housed in said one of said larger portions and is axially adjacent to the chamber of the impeller.

3. Pump assembly according to claim 1, characterized in that a rotor of the electric motor is coupled to the shaft of the impeller by means of a rotor bell, rotationally integral with the shaft, and in that a sensor for detecting the rpm of the impeller is arranged in correspondence with said rotor bell.

4. Pump assembly according to claim 1, wherein the electric motor has a stator arranged in a radially external position with respect to the rotor.

5. Pump assembly according to claim 1, characterized in that it comprises a cooling circuit of the electric motor coupled to the cooling circuit for recirculating the cooling fluid of the heat engine, the cooling circuit of the electric motor comprising at least a delivery channel and a return channel of the cooling fluid from and/or to a chamber of the impeller.

6. Pump assembly according to claim 5, wherein the electric motor has a stator, the pump body is sized and configured to support the stator, and the cooling circuit of the electric motor is formed in the pump body adjacent the stator of the electric motor.

7. Pump assembly according to claim 1, wherein said pulley is in a single piece with a first of said larger portions that houses said clutch, mounted on a bearing keyed on a second of said larger portions that houses said electric motor; said first larger portion defining a rotor of the clutch.

8. Pump assembly according to claim 1, characterized in that said clutch is of the electromagnetic type, and comprises: a fixed electromagnet, a flow element for concatenating a magnetic flow and a keeper, axially arranged opposite to the flow element with respect to the electromagnet.

9. Pump assembly according to claim 7, wherein the clutch includes an electromagnet and a keeper, the rotor of the clutch has an axially fixed annular plate arranged on the opposite side of the keeper with respect to the electromagnet and fixed to the rotor by means of axial screws holding axial bushes which form a guiding element to an axial translation of the keeper.

10. Pump assembly according to claim 7, characterized in that a sleeve is mounted on said driven shaft, rotationally integral and axially movable with respect to the shaft, a circular flange being integral with the sleeve and being axially interposed between a keeper and a fixed plate of the clutch.

11. Pump assembly according to claim 10, characterized in that a friction material is applied on the opposite faces of the annular flange.

12. Pump assembly according to claim 8, characterized in that it comprises a plurality of springs axially contained in corresponding seats of an axial extension of the rotor of the clutch against which they react and acting on the keeper by pushing it in the axial direction in the direction of the detachment of the flow element and towards a fixed plate of the clutch.

13. Pump assembly according to claim 1, characterized in that it comprises a friction and an excitation clutch.

14. Pump assembly according to claim 13, characterized in that the excitation clutch comprises a fixed electromagnet, an element for concatenating the flow constrained to a rotor by means of screws, a keeper integral with the annular flange by means of an elastic membrane which rotationally constrains the keeper, but allows the axial movement of the latter.

15. Pump assembly according to claim 1, wherein the clutch includes an electromagnet, the electromagnet is controlled by means of the PWM (Pulse Width Modulation) technique.

16. Pump assembly for recirculating a cooling fluid of vehicles according to claim 8, wherein the electromagnet controlling the clutch comprises at least two coils, powered in order to generate an initial current in the coils to determine a high returning force of the keeper towards the flow element for concatenating the flow, and a subsequent holding current to determine a reduced holding force of the keeper against the flow element for concatenating the flow.

17. Pump assembly according to claim 16, characterized in that the at least two coils are one more powerful and one less powerful than the other and/or in that one activation of the coils is selective.

18. Pump assembly according to claim 17, characterized in that the two coils are connected to each other in parallel.

19. Pump assembly according to claim 17, characterized in that in order to determine said initial returning force of the keeper the more powerful coil and/or both coils are excited, and in order to determine said reduced holding force of the keeper once its return has occurred, one single coil is excited, for example the less powerful coil.

20. Pump according to claim 16, characterized in that the two coils have the same power and are connected by a power supply circuit which can be switched from parallel to series and vice versa, and in that, in order to determine said initial returning force of the keeper, the two coils are connected in parallel and excited and, once the return has occurred, the two coils are connected in series and excited, to determine said reduced holding force of the keeper.

\* \* \* \* \*